UNITED STATES PATENT OFFICE.

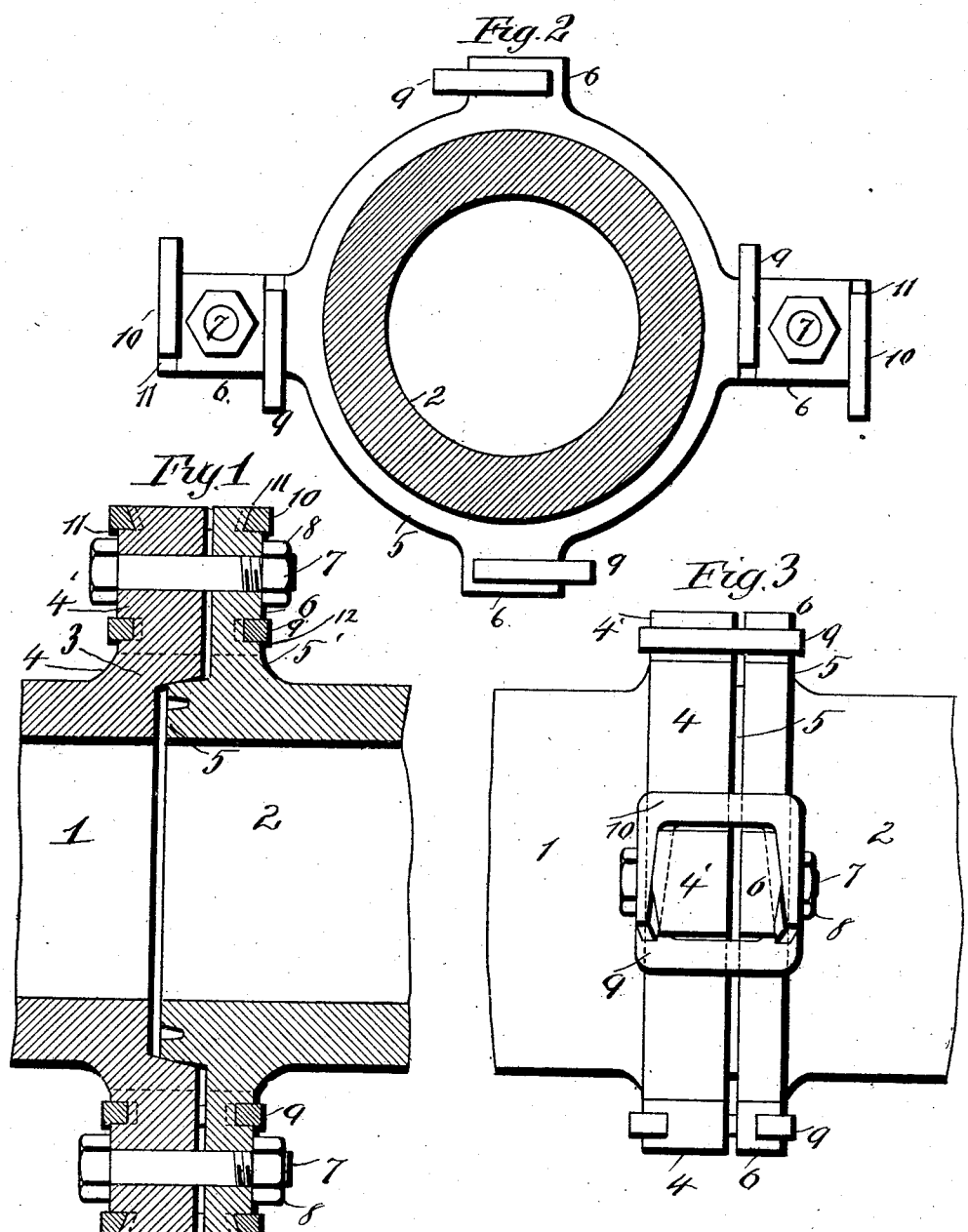

CHARLES R. SCHMIDT, OF BALTIMORE, MARYLAND.

PIPE-COUPLING.

No. 869,106.　　　　Specification of Letters Patent.　　　Patented Oct. 22, 1907.

Application filed December 14, 1906. Serial No. 347,861.

*To all whom it may concern:*

Be it known that I, CHARLES R. SCHMIDT, a citizen of the United States, residing at Baltimore, in the county of City of Baltimore and State of Maryland, have invented certain new and useful Improvements in Pipe-Couplings, of which the following is a specification.

This invention has relation to pipe couplings, and especially to couplings for cast iron pipes of large diameter, such as are used for the conveyance of fluids or gases under pressure.

The object of this invention is to overcome the objections to the use of and the disadvantages of wrought iron bolts in coupling pipes having ground or machined ends. As is well known wrought iron, or steel bolts, particularly when applied to pipes laid under ground or subjected to moisture or atmospheric influences, are liable to corrosion, by which the bolts are destroyed and leakage produced.

With this object in view my invention consists in the combination with the other coupling elements of alined pipes, comprising bell or faucet and spigot ends, surrounding flanges, and bolts passing through said flanges, of clamps constituting supplementary fastenings, and serving to adequately hold the parts together and maintain a tight joint in the event of any corrosion or other accidental impairment of the bolts.

In the accompanying drawing: Figure 1, is a longitudinal sectional view of two alined and coupled sections of pipe, having my improvement embraced in the coupling. Fig. 2, is a transverse section of the same. Fig. 3, is a top view of the same.

1 and 2 designate two lengths or sections of pipe, one of which is represented with a bell end 3, and a flange 4, having a plurality of external radial lugs 4′, and the other with a spigot end 5, entering the bell 3, and having also a flange 5′ and a plurality of lugs 6, similar to the lugs 4′. The inner surface of the bell and the outer surface of the spigot are usually machined or ground, and tapered.

7, 7, designate the bolts passing transversely through the lugs 4, 6, and having nuts 8, 8, to tighten up the parts.

To provide for the application of the clamps 9 and 10, the lugs 4′ and 6, are recessed or channeled on opposite sides of the bolt holes as shown at 11 and 12, for the reception of the clamps which are "U" shaped castings, the legs of which are slightly divergent, so that they may be wedge driven or pressed on to the lugs after the bolts have been tightened up, and will exert a pressure of their own due to their elasticity. The clamps 10, are held in place and prevented from being accidentally displaced, by slightly dovetailing the recesses 11, and correspondingly shaping the legs of the clamps 10.

The clamps may be strengthened by forming them with exterior flanges, or making them "T" shaped in cross section.

What I claim is:

1. A pipe section or length, having exterior lugs transversely pierced for bolts, and grooved transversely of the pipe and at an oblique angle with its axis, for the reception of clamps.

2. In couplings for pipes, the combination with the sections or length of pipe having external lugs with grooves or recesses disposed transversely of the pipe and at an oblique angle to its axis, and bolts passing transversely through said lugs, of clamps embracing the lugs, and seated in said grooves or recesses.

3. A pipe section having exterior lugs at each end, said lugs being grooved transversely of the pipe and at an oblique angle to its longitudinal axis, for the reception of clamps.

4. In couplings for pipes the combination with pipe sections having external circumferential projecting portions grooved transversely of the pipe and at an oblique angle to the axis of the pipe, of clamps fitting in said grooves.

5. In couplings for pipes, the combination with pipe sections, having external circumferential projecting portions grooved transversely of the axis of the pipe, of clamps embracing said lugs and adjustable transversely of the pipe.

6. In couplings for pipes, the combination with pipe sections, having external circumferential lugs, of clamps embracing said lugs and movable transversely of the pipe axis.

7. In couplings for pipes, the combination of pipe sections having external circumferential lugs, of clamps embracing said lugs; and having the clamping members tapered or converging towards each other.

8. In pipe couplings, the combination with pipe sections having external, circumferential lugs, of elastic metallic clamps embracing said lugs.

9. In pipe couplings, pipe sections having external circumferential lugs, each having two grooves disposed transversely of the axis of the pipe, and running respectively at opposite oblique angles.

In testimony whereof I affix my signature, in presence of two witnesses.

CHARLES R. SCHMIDT.

Witnesses:
　THOS. A. CONNOLLY,
　JOS. B. CONNOLLY.